(12) United States Patent
Price

(10) Patent No.: US 6,715,228 B1
(45) Date of Patent: Apr. 6, 2004

(54) ANIMATED GAME BIRD DECOY

(76) Inventor: Frank D. Price, 1205 S. Highschool St., Ada, OK (US) 74820

( * ) Notice: Subject to any disclaimer, the term of this patent is extended or adjusted under 35 U.S.C. 154(b) by 0 days.

(21) Appl. No.: 10/375,960

(22) Filed: Mar. 1, 2003

(51) Int. Cl.[7] .............................................. A01M 31/06
(52) U.S. Cl. ..................................................... 43/3; 43/2
(58) Field of Search ............................ 43/3, 2; D22/125

(56) References Cited

U.S. PATENT DOCUMENTS

| | | | | |
|---|---|---|---|---|
| 74,458 A | * | 2/1868 | Wales | 43/3 |
| 547,553 A | * | 10/1895 | Keller | 446/361 |
| 740,293 A | * | 9/1903 | Loeble | 43/3 |
| 1,831,286 A | * | 11/1931 | Chelini | 43/3 |
| 2,413,418 A | * | 12/1946 | Rulison | 43/3 |
| 2,443,040 A | | 6/1948 | Jones | 43/3 |
| 2,480,390 A | | 8/1949 | Thompson | 43/3 |
| 2,536,736 A | * | 1/1951 | Gazalski | 43/3 |
| 2,704,416 A | | 3/1955 | Laird | 46/92 |
| 2,747,314 A | | 5/1956 | McGregor | 43/3 |
| 2,747,316 A | * | 5/1956 | Benedetto | 43/3 |
| 3,074,195 A | | 1/1963 | Vanderpool | 43/3 |
| 4,128,958 A | | 12/1978 | Snow | 43/3 |
| 4,896,448 A | | 1/1990 | Jackson | 43/3 |
| 5,003,722 A | * | 4/1991 | Berkley et al. | 43/3 |
| 5,144,764 A | * | 9/1992 | Peterson | 43/3 |
| 5,231,780 A | | 8/1993 | Gazalski | 43/3 |
| 5,682,702 A | * | 11/1997 | McKnight et al. | 43/3 |
| 5,809,683 A | | 9/1998 | Solomon | 43/3 |
| 5,862,619 A | | 1/1999 | Stancil | 43/3 |
| 5,960,577 A | | 10/1999 | Walterson | 43/3 |
| 6,170,188 B1 | | 1/2001 | Mathews | 43/3 |
| 6,293,042 B1 | * | 9/2001 | Arvanitis et al. | 43/3 |
| 6,360,474 B1 | * | 3/2002 | Wurlitzer | 43/3 |
| 6,408,559 B2 | * | 6/2002 | Mathews | 43/3 |
| D462,412 S | * | 9/2002 | Solomon | D22/125 |
| 6,493,980 B1 | * | 12/2002 | Richardson et al. | 43/3 |
| D475,759 S | * | 6/2003 | Salato | D22/125 |
| D477,651 S | * | 7/2003 | Paw | D22/125 |
| 6,599,160 B2 | * | 7/2003 | Weiser et al. | 446/35 |
| 2003/0106253 A1 | * | 6/2003 | Loughman | 43/2 |
| 2003/0110676 A1 | * | 6/2003 | Mathews | 43/3 |

FOREIGN PATENT DOCUMENTS

| | | | | |
|---|---|---|---|---|
| GB | 2067064 A | * | 7/1981 | A01M/31/06 |
| GB | 2189124 A | * | 10/1987 | A01M/31/06 |

* cited by examiner

*Primary Examiner*—Peter M. Poon
*Assistant Examiner*—Joan M. Olszewski

(57) ABSTRACT

The animated game bird decoy simulates wing movements of various species and creates the illusion of living waterfowl on water by disturbing the surface of the water. A wing/paddle constructed from a planar flexible material is mounted to a flexible stem situated beneath a stationary hollow decoy. An operating cord manipulated by a hunter is attached to the steam Alternately applying and releasing tension on the line causes movement of the flexible stem that imparts motion to the wing/paddle device. The oscillating movement of the wing/paddle device produces the illusion of a duck with beating wings on the surface of the water. The unit can be used in the absence of water, the hunter relying on the stationary decoy and the movement of the wings to attract waterfowl. The unit does not rely on motors or air movement, and activates only when the hunter applies and releases tension on the cord.

8 Claims, 5 Drawing Sheets

ANIMATED GAME BIRD DECOY

FIELD OF THE INVENTION

The present invention relates to animated game bird decoys and more particularly to waterfowl decoys that simulate wing movements of live birds and create disturbances on the surface of the water near the position of the decoy.

CROSS-REFERENCE TO RELATED APPLICATIONS

Not applicable.

FEDERALLY SPONSORED DEVELOPMENT

Not applicable.

LISTINGS, TABLES, COMPUTER PROGRAMS, COMPACT DISK APPENDIX

Not applicable.

BACKGROUND OF THE INVENTION

Hunters for many years have used decoys to attract waterfowl to a particular location Traditionally the decoys were motionless floating replicas of waterfowl that the hunter placed in the water to attract the birds within gun range. In recent years practitioners in the art recognized that wing movements and disturbances on the surface of the water add realism to decoys and enhance their effectiveness. Consequently, motor driven motion decoys that proved somewhat effective were introduced. The decoys with motors are not waterproof and exhibit other negative attributes such as high cost, unnatural mechanical noises, and power and mechanical failure. Some examples of the prior art did not create disturbances such as ripples and splashes on the water common to living waterfowl.

U.S. Pat. No. 5,809,683, issued Sep. 22, 1998, discloses a motorized decoy that moves the decoy wings and feet in a crude manner. The decoy described in the patent produces unnatural mechanical noises audible from a distance and minimal disturbances on the surface of the water.

U.S. Pat. No. 6,170,188 issued Jan. 9, 2001, discloses a motorized decoy that rotates a pair of wing members. A stand supports the decoy above the surface of the water. Therefore, surface water disturbance is minimal. When employed, a motor is susceptible to power and mechanical failure.

Other inventors practicing the art recognized the deficiencies of motorized decoys and attempted to make a motion decoy that employs no motor. One example of a motion decoy without a motor is disclosed in U.S. Pat. No. 5,862,619 issued Jan. 26, 1999. The patent describes a decoy with wings that spin when sufficient air movement causes the wings to rotate. In windless conditions the decoy becomes a motionless decoy similar to the passive decoys used by earlier hunters. In an alternative embodiment, the described decoy can be equipped with a motor that can spin the wings in the absence of wind force. The motor causes the apparatus to be susceptible to power and mechanical failure. Configured with or without a motor, the decoy is suspended above the water. Therefore, the described decoy does not cause disturbances on the surface of the water.

SUMMARY OF THE INVENTION

The present invention realistically simulates wing movements of various waterfowl species and creates the illusion of living waterfowl by disturbing the surface of the water when employed in its preferred embodiment. A flexible unitary wing/paddle is mounted to a flexible stem and situated beneath a stationary decoy or hollow decoy shell. One end of an operating line is attached to the flexible stem. The apparatus is positioned on a stake such that the central and lower portion of the wing/paddle is beneath the water surface and the outer and upper portions of the wing/paddle are above the water surface. The hunter alternately applies and releases tension on the operating line causing back and forth movements of the stem. The moving stem imparts motion to the wing/paddle. The oscillating movement of the wing/paddle produces the illusion of waterfowl with beating wings and causes ripples and splashing on the surface of the water. The present invention is mechanically simple, waterproof cost effective to construct, silent, and effective in its intended purpose of luring game to a target area.

Alternatively, the apparatus can be used in the absence of water where the hunter relies on the decoy and the movement of the wings to attract waterfowl.

ADVANTAGES AND OBJECTS

The present invention overcomes the negative attributes of motorized and winddriven decoys. The apparatus does not rely on motors or air movement to create motion and activates only when the hunter applies and releases tension on an operating line. The apparatus provides the hunter with a waterproof, lightweight, inexpensive, and reliable decoy that operates silently. Moreover, the invention allows the hunter to create realistic wing and water motions thereby attracting the quarry to the intended target area.

It is an object of the present invention to provide an inexpensive, lightweight, and mechanically reliable game bird decoy that does not employ a motor or rely on wind force to produce motion.

Further, it is an object of the present invention to provide a silent game bird decoy that simulates wing movements of living waterfowl on water and land.

Likewise, it is an object of the present invention to provide a waterproof motion decoy that creates lifelike disturbances such as ripples and splashes on the surface of the water when the hunter animates the apparatus.

It is further an object of the present invention to provide an apparatus that can be easily employed to convert a conventional game bird decoy into the animated game bird decoy of the present invention.

It is further an object of the present invention to provide a motion decoy that can be activated and deactivated at will by the hunter without the aid of electronically activated remote controls.

It is further an object of the present invention to provide a motion decoy that is lightweight and easily transported for use in remote locations.

Figure 1:
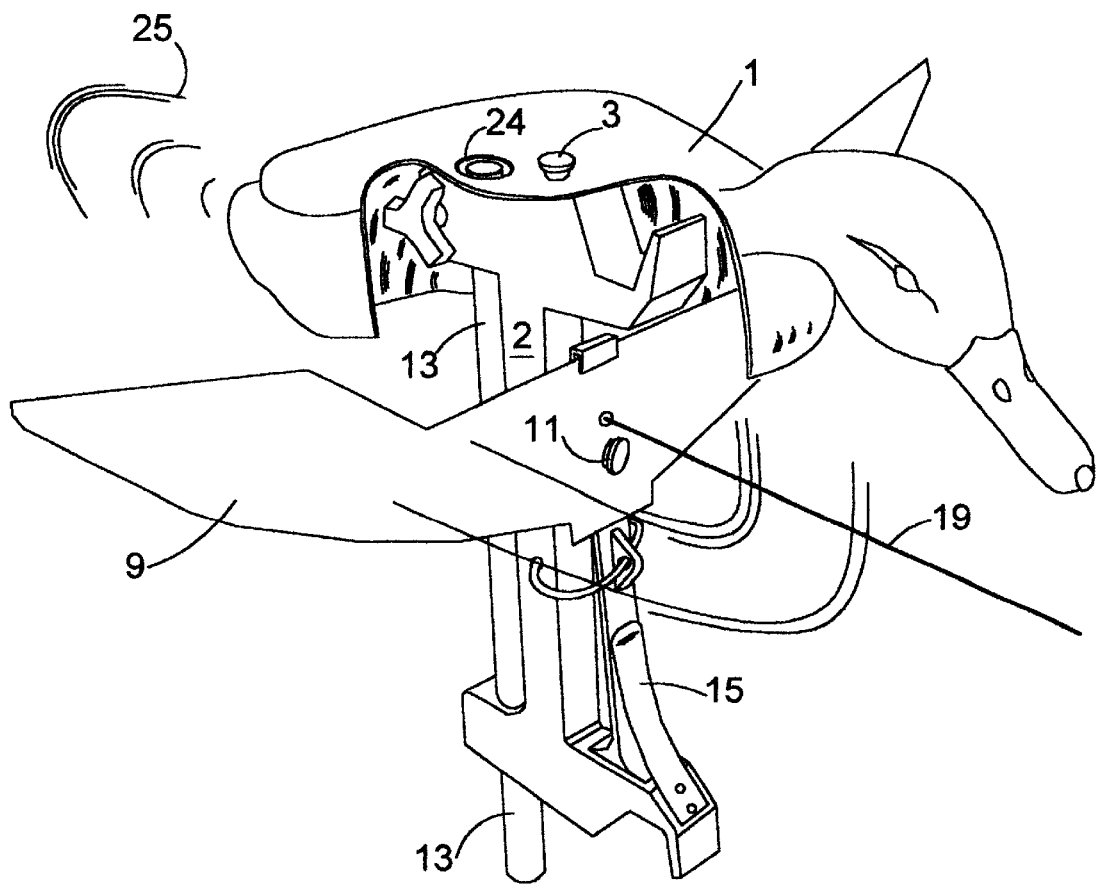
FIG. 1 is a perspective view of the decoy apparatus positioned in the water such that the wing/paddle is partially submerged beneath the water surface.

REFERENCE NUMERALS IN DRAWINGS 1 decoy body 2 structural frame 3 male threaded fastener 4 female threaded receiver 5 flexible support stem 6 clamp 7 frame stabilizer 8 stem support 9 wing/paddle 10 stem notch 11 male threaded fastener 12 female threaded receiver 13 stake 14 rivet 15 flat spring 16 harness 17 eyelet 18 hole through frame 19 operating line 20 upper wing/paddle hole 21 lower wing/paddle hole 22 operating line knot 23 bolt and threaded knob assembly 24 decoy hole 25 water surface 26 hole in hollow decoy.

DETAIL DESCRIPTION OF THE INVENTION

Figure 2:
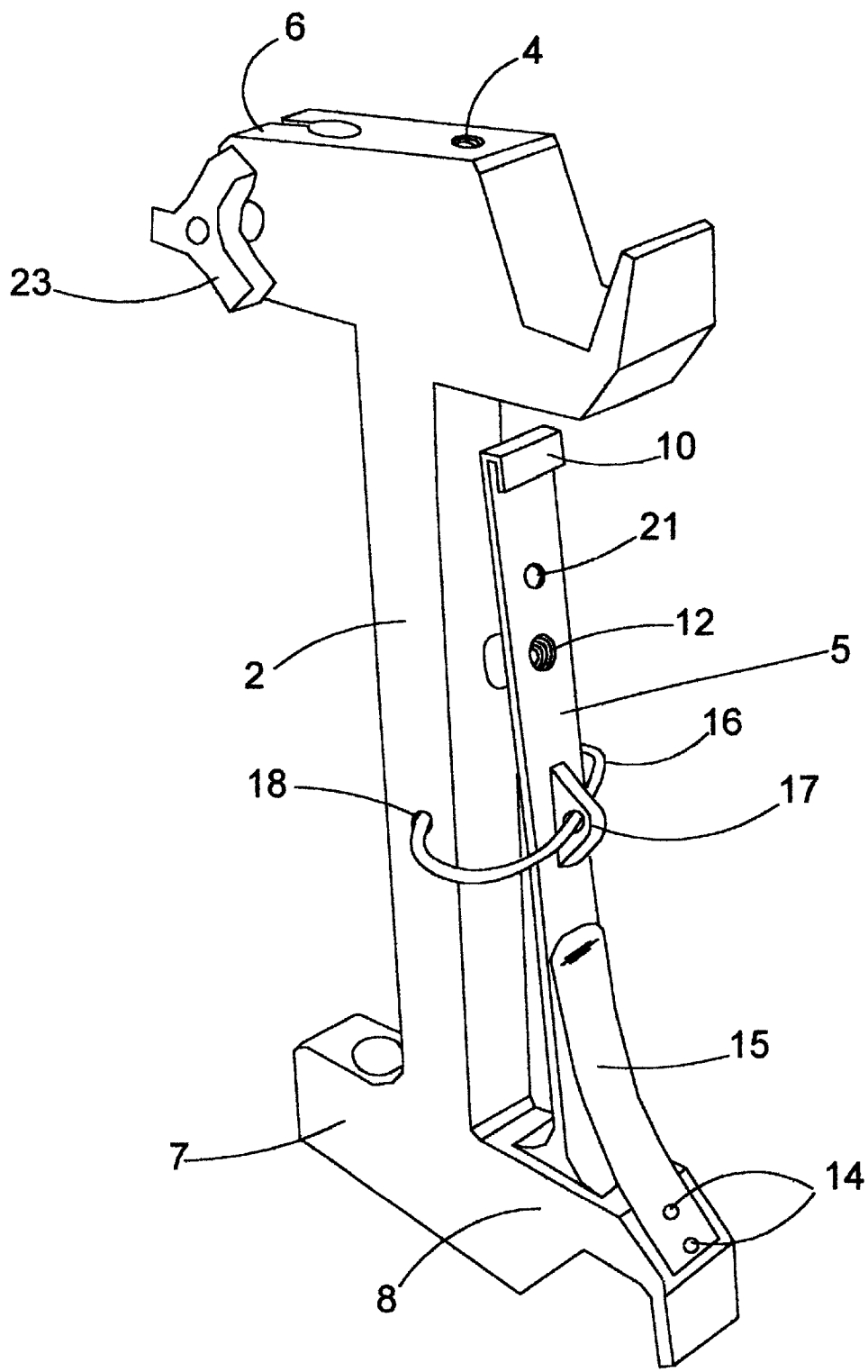
FIG. 2 is a perspective view of the structural frame illustrating various components of the frame.
Figure 4:
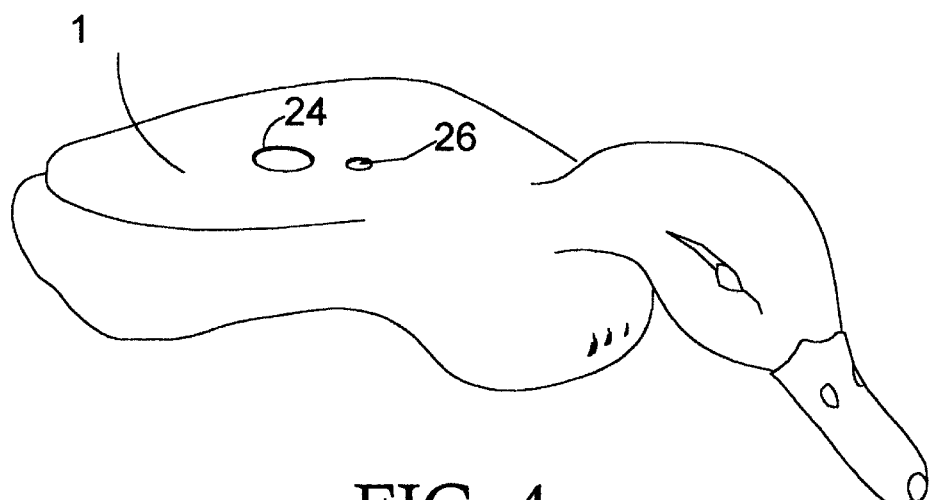
FIG. 4 is a perspective view of hollow decoy 1.

Reference FIGS. 1, 2, and 4. A bird replica in the form of a hollow body waterfowl decoy 1 is positioned on structural frame 2. Decoy 1 is secured to frame 2 with male threaded fastener 3 by inserting fastener 3 through hole 26 in decoy 1 and screwed into a female threaded receiver 4 formed into the top of frame 2.

Reference FIG. 2. Frame 2 in its preferred embodiment is a unitary molded structural member comprised of flexible stem 5, clamp 6, frame stabilizer 7, and stem support 8. Frame 2 is preferably constructed from plastic using a high-pressure injection molding technique.

Figure 3:
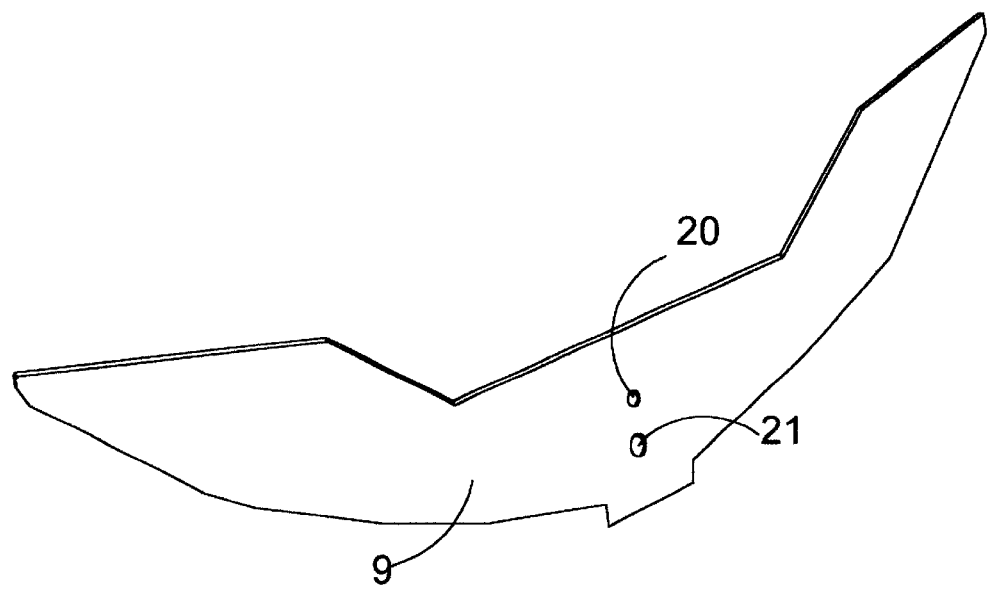
FIG. 3 is a perspective view of the wing/paddle, the part of the apparatus that emulates the wings of a bird and produces the ripples and splashes in the water.

Reference FIGS. 1, 2, and 3. Wing/paddle 9 is a planar flexible member preferably constructed of plastic, but an alternative flexible material such as aluminum may be used. Wing/paddle 9 is attached to flexible stem 5 by inserting the top center edge of wing/paddle 9 into stem notch 10 formed into the top of stem 5. Male threaded fastener 11 further secures wing/paddle 9 when inserted through hole 21 and screwed into female threaded receiver 12 formed into stem 5.

Reference FIG. 2. Stem 5 is preferably formed integrally with frame 2 during the injection molding process, but alternately a different material with suitable flexing and resilient properties may be substituted and attached to frame 2. The bottom of stem 5 is immovable and fixed to stem support 8. The top of stem 5 is free to allow rotational displacement.

Reference FIG. 2. Clamp 6 is preferably formed integrally with frame 2 during the injection molding process, but an alternative clamping device may be substituted and attached to frame 2. Clamp 6 interior is hollow and tubular shaped to receive stake 13.

Reference FIG. 2. Attached to frame 2 with rivets 14 is flat spring 15. The bottom of flat spring 15 is attached to frame 2 such that the top of spring 15 rests unattached on flexible stem 5.

Reference FIG. 2. Frame stabilizer 7 is a hollow receivable member sized to accept stake 13. Stabilizer 7 is preferably formed integrally with frame 2 during the injection molding process.

Reference FIGS. 1 and 2. Harness 16 is a closed loop of flexible cord threaded through a hole in eyelet 17 and hole 18 in frame 2. Eyelet 17 is preferably formed continuously into stem 5 in the injection mold process. Eyelet 17 supports harness 16. Harness 16 limits stem 5 rotational displacement as the hunter applies tension to operation line 19.

Reference FIGS. 1, 2, 3, and 4. Frame stabilizer 7 and clamp 6 stabilize the apparatus when the hunter applies tension on operating line 19. Operating line 19 is preferably a length of high-strength low-stretch line but may also be constructed of wire, cord, or rope. One end of line 19 is inserted through wing/paddle hole 20 and hole 21 in stem 5. Line 19 is secured to stem 5 by tying knot 22 in said end of line 19 to prevent the line from slipping through said holes when the hunter applies tension to operating line 19.

Operation. Reference FIGS. 1, 2, 3, 4, and 5.

Reference FIGS. 1 and 2. When the apparatus is used over water, frame 5 is positioned vertically by loosening bolt and female threaded knob 23 and clamp 6 and sliding frame 2 up or down stake 13 such that the lower portion of wing/paddle 6 is partially submerged. Alternatively, stake 13 and the apparatus described herein can be used in the absence of water on dry or moist land. Hole 24 is optional and may be cut into decoy 1 allowing stake 13 to extend through decoy 1 providing greater vertical adjustment of the apparatus. Frame 2 is secured to stake 13 by tightening clamp 6 with bolt and female threaded knob 23. Stake 13 is a tubular metal member commercially available and common to the electrical industry. Stake 13 supports and stabilizes the apparatus. The bottom of stake 13 is normally positioned in the ground beneath the water with the top of stake 13 extending vertically beyond the water surface.

Figure 5:
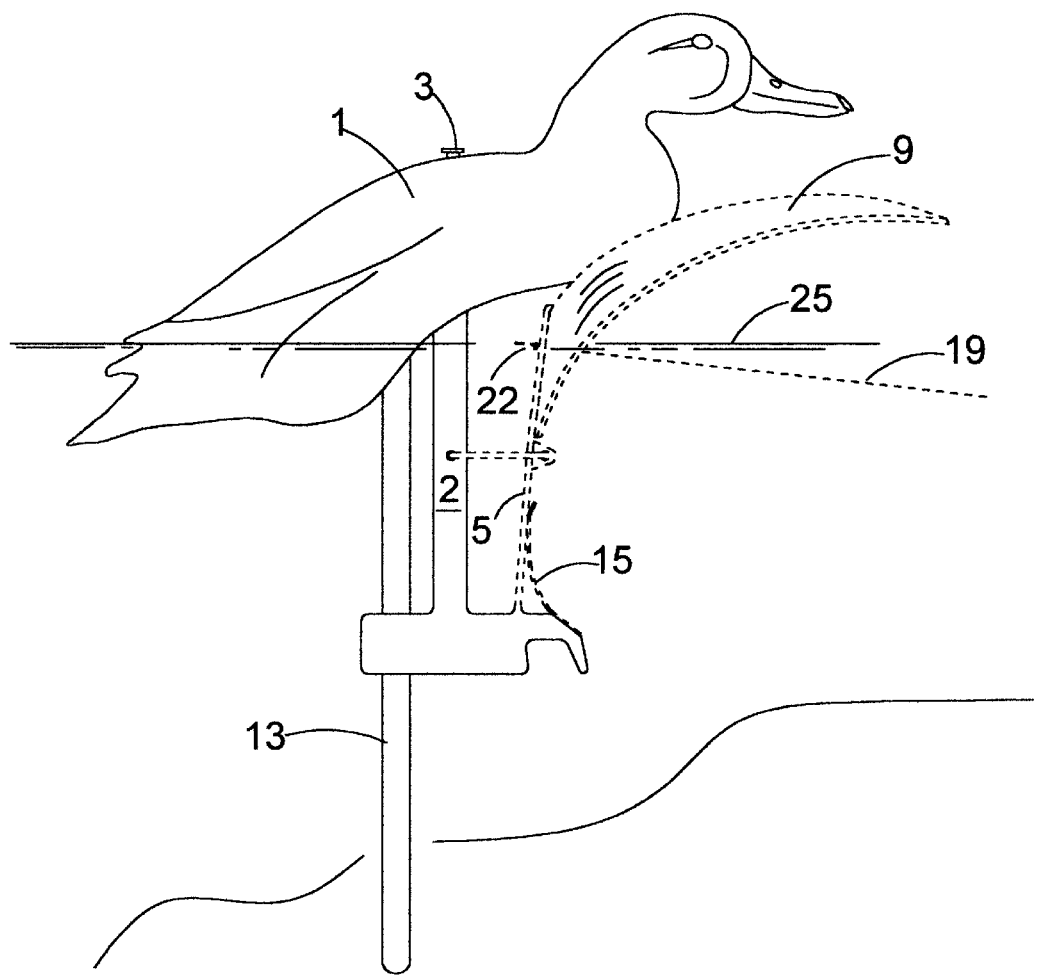
FIG. 5 is a side view of the apparatus showing movement of the wing/paddle during operation a moment after tension on the operating line is released. The top of the flexible stem supporting the wing/paddle is moving in an arc toward the structural frame.
Figure 6:
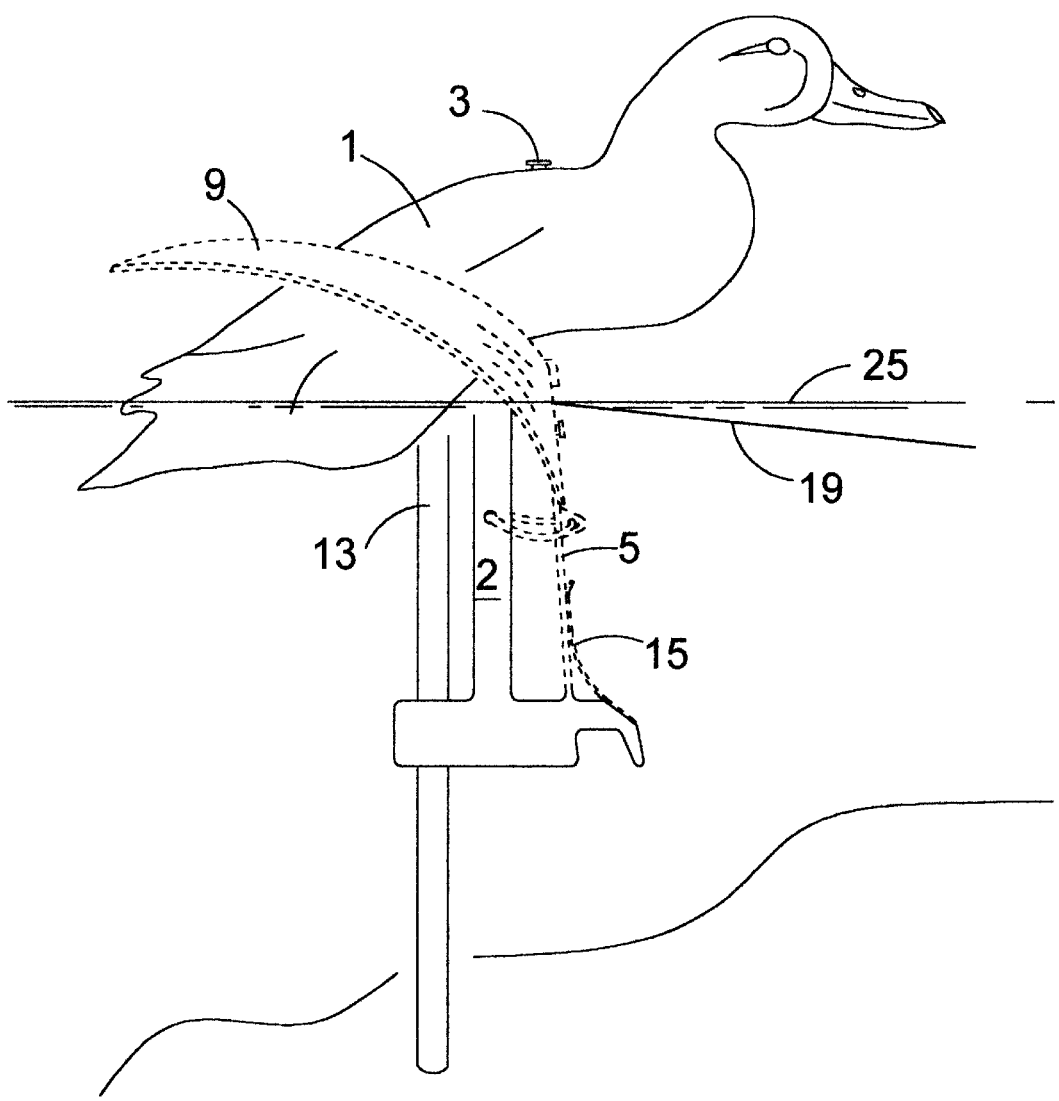
FIG. 6 is a side view of the apparatus showing movement of the wing/paddle a moment after tension is applied or re-applied to the operating line. The top of the flexible stem supporting the wing/paddle is moving in an arc away from the structural frame.

Reference FIGS. 4 and 5. The hunter animates the apparatus by first applying tension to operating line 19. As tension is applied, the top of flexible stem 5 moves in an arc toward the hunter causing wing/paddle 9 to move in an arced path toward the head of decoy 1. As the hunter applies tension in the form of a horizontal force through operating line 19, spring 15 stores energy. FIG. 4 illustrates the approximate position of wing/paddle 9 and stem 5 a moment after tension on operating line 19 is released. When the hunter releases the tension on operating line 19, the resilient properties of stem 5 and the stored energy in spring 15 force stem 5 and wing/paddle 9 to move away from the head of decoy 1. FIG. 5 illustrates the approximate position of wing/paddle 9 and stem 5 a moment after tension is applied or re-applied to line 19. The hunter continues to impart movement to wing/paddle 9 by alternately applying and releasing tension on operating line 19. When positioned in water the described movements of stem 5 and wing/paddle 9 create lifelike actions common to living waterfowl. More specifically, the actions created mimic beating wings of a bird and ripples and splashes on the surface of the water.

In an alternative embodiment, the present invention can be constructed without decoy 1. The hunter can use the apparatus without decoy 1, or the hunter can readily modify a conventional decoy for use with the described mechanical apparatus.

In yet another embodiment, a submerged paddle can be substituted for the wing/paddle. The submerged paddle produces ripples and splashes without simulating wing movements of living waterfowl when activated by the hunter.

Another embodiment substitutes a silhouette in the form of a feeding duck for the wing/paddle. The silhouette emulates a feeding waterfowl and produces ripples and splashes without simulating wing movements of living waterfowl when activated by the hunter.

Conclusion, Ramifications, and Scope

The present invention solves the noted deficiencies in static and animated decoys. The waterproof apparatus allows the hunter to simulate live birds, typically waterfowl, on water or land. When operated in water, the apparatus produces wing movements and water surface disturbances associated with living waterfowl. When employed in the absence of water, the apparatus simulates the beating wings of living waterfowl.

The apparatus, produced using lightweight materials, can be readily transported and operated in remote locations.

No artificial power supply or motor is required, and the present invention does not depend on wind force. The hunter alone produces the desired animation by applying and releasing tension on the operating line.

The attributes described provide the hunter with a device that reliably, quietly, and effectively attracts various bird species.

It is to be understood that all matter set forth herein and in the accompanying documents is to be interpreted as illustrative and not in a limiting sense as many embodiments may be made of the present invention without deviating from the scope thereof.

I claim:

1. An animated decoy apparatus comprising:
   a bird replica
   a rigid stake positioned substantially vertically
   a substantially vertical and flexible support of a predetermined cross-section and length with a top end and a bottom end, said top end movable and said bottom end immovable, said flexible support having a front side and a back side
   a wing/paddle attached to said movable end of said flexible support
   a structural frame to support said bird replica and said flexible support which has the wing/paddle attached thereto
   an attachment means to connect said frame to said stake at a predetermined position
   a flexible tension member of a predetermined cross-section and strength, one end connected to said flexible support whereby a force is applied to said flexible support.

2. An animated decoy apparatus according to claim 1, wherein said replica is hollow body with a receivable interior.

3. An animated decoy apparatus according to claim 1, wherein said rigid stake is made from metal tubing of a predetermined cross-section and length.

4. An animated decoy apparatus according to claim 1, wherein said flexible support is reinforced with a flat spring, said flat spring of metal having a top end and a bottom end, said bottom end immovably fixed to said frame whereby the top end of said spring rests unattached on the front side of said flexible support.

5. An animated decoy apparatus according to claim 1, wherein said wing/paddle is a planar sheet of flexible material configured to emulate the extended wings of a bird, said wing/paddle extending substantially normal to said bird replica.

6. An animated decoy apparatus according to claim 1, wherein said frame is a unitary molded plastic member comprising said flexible support and said attachment means.

7. An animated decoy apparatus according to claim 1, wherein said attachment means is a hollow clamp through which extends said stake.

8. An animated decoy apparatus according to claim 1, wherein a harness restricts rotational movement of said flexible support when a force is applied to said tension member, whereas said harness is a flexible cord of a predetermined length forming a closed loop through said frame and encircling said flexible support.

* * * * *